United States Patent [19]
Lee

[11] Patent Number: 5,849,430
[45] Date of Patent: Dec. 15, 1998

[54] STRUCTURE OF AN ELECTRODE OF A SECONDARY BATTERY

[75] Inventor: Jae-Ho Lee, Suwon, Rep. of Korea

[73] Assignee: Samsung Display Devices Co., Ltd., Kyunggi-do, Rep. of Korea

[21] Appl. No.: 785,312

[22] Filed: Jan. 21, 1997

Related U.S. Application Data

[63] Continuation-in-part of Ser. No. 529,273, Sep. 15, 1995, abandoned.

[30]     Foreign Application Priority Data

May 31, 1995 [KR]    Rep. of Korea ................. 1995-14252

[51] Int. Cl.⁶ ..................................................... H01M 4/70
[52] U.S. Cl. .............................. 429/94; 429/233; 429/241
[58] Field of Search .............................. 429/94, 223, 233, 429/241, 163

[56]              References Cited

U.S. PATENT DOCUMENTS

| | | | |
|---|---|---|---|
| 4,105,832 | 8/1978 | Sugalski | 429/94 |
| 4,283,844 | 8/1981 | Milden et al. | 29/623.5 |
| 5,053,292 | 10/1991 | Hasebe et al. | 429/101 |
| 5,434,019 | 7/1995 | Zhang | 429/10 |
| 5,498,496 | 3/1996 | Sasaki et al. | 429/241 |
| 5,527,638 | 6/1996 | Kinoshita et al. | 429/101 |
| 5,554,463 | 9/1996 | Marincic et al. | 429/241 |
| 5,637,416 | 6/1997 | Yoshii et al. | 429/223 |

FOREIGN PATENT DOCUMENTS

WO95/06333   3/1995   WIPO.

OTHER PUBLICATIONS

Japanese Patent Abstract, Publication No. 59099675, Publication Date Aug. 6, 1984, p. 1.
Japanese Patent Abstract, Publication No. 59117062, Publication Date Jun. 7, 1984, p. 1.
Japanese Patent Abstract, Publication No. 60037662, Publication Date Feb. 2, 1985, p. 1.

*Primary Examiner*—Prince Willis, Jr.
*Assistant Examiner*—Carol Chaney
*Attorney, Agent, or Firm*—Christie, Parker & Hale, LLP

[57]           ABSTRACT

Disclosed is a secondary battery, which comprises a cylindrically wound laminate consisting of a positive electrode plate, a negative electrode plate and a separator plate interposed therebetween, the negative electrode plate including an electrolytically active substance, a perforated support plate for supporting the electrolytically active substance and serving as an electron collector, the electrolytically active substance being applied to both side surfaces of the support plate, a protective can for enclosing the cylindrically wound laminate, and an electrolyte, wherein the perforation density of the perforated support plate is made greater in the outer portions more than in the central portion, so that the binding forces between the support plate and the electrolytically active substance become substantially uniform throughout the support plate and the conductivity of the support plate is considerably increased.

15 Claims, 8 Drawing Sheets

$\phi$" ≠ const
Px" = const
Py" = const

FIG.12 outer portion central portion outer portion

FIG.13 outer portion central portion outer portion

FIG.14

STRUCTURE OF AN ELECTRODE OF A SECONDARY BATTERY

This application is a Continuation-in-Part of application Ser. No. 08/529,273 filed Sep. 15, 1995 and now abandoned.

FIELD OF THE INVENTION

The present invention concerns various types of secondary batteries with cylindrically wound laminates consisting of a positive electrode plate, a negative electrode plate and a separator plate interposed therebetween, and more specifically the structure of the electrodes.

BACKGROUND OF THE INVENTION

The nickel-cadmium battery is mainly used as a secondary battery. However, it has a small storage capacity and moreover the cadmium results in serious environmental pollution. Hence, the alkaline nickel metal hydride secondary battery, which does not cause the environmental pollution and has the storage capacity of 30% to 50% more than the nickel cadmium battery, tends to supplant the nickel-cadmium battery. The nickel metal hydride battery comprises a metal oxide as the positive electrode and a hydrogen retainer alloy as the negative electrode, having a high output density. The hydrogen retainer alloy absorbs the hydrogen generated in the charging process to discharge it into the electrolyte during the discharging process.

Generally, the nickel metal hydride battery comprises a cylindrically wound laminate consisting of a positive electrode plate, a negative electrode plate and a separator plate interposed therebetween, a protective can for enclosing said cylindrically wound laminate, and an electrolyte. In such alkaline secondary battery, the negative electrode typically includes a support means for supporting an electrolytically active substance and serving as an electron collector. The support means usually consists of a perforated steel plate coated with nickel, to both side surfaces of which is applied a slurry of an electrolytically active substance.

In this case, the configuration of the perforation adversely affects the physical properties of the battery. For example, as the perforation area density is increased throughout the support plate, the binding force between the surfaces of the support plate and the electrolytically active substance becomes stronger, thus reducing the phenomena of the active substance being detached from the support plate, but the conductivity of the support plate is reduced and the physical strength of the support plate is weakened causing the fracture thereof. On the contrary, the physical strength and the electrical conductivity of the support plate are increased with decrease of the perforation area density, but the active substance is easily detached from the support plate thus resulting in the shortening of the battery's life.

Figure 1:
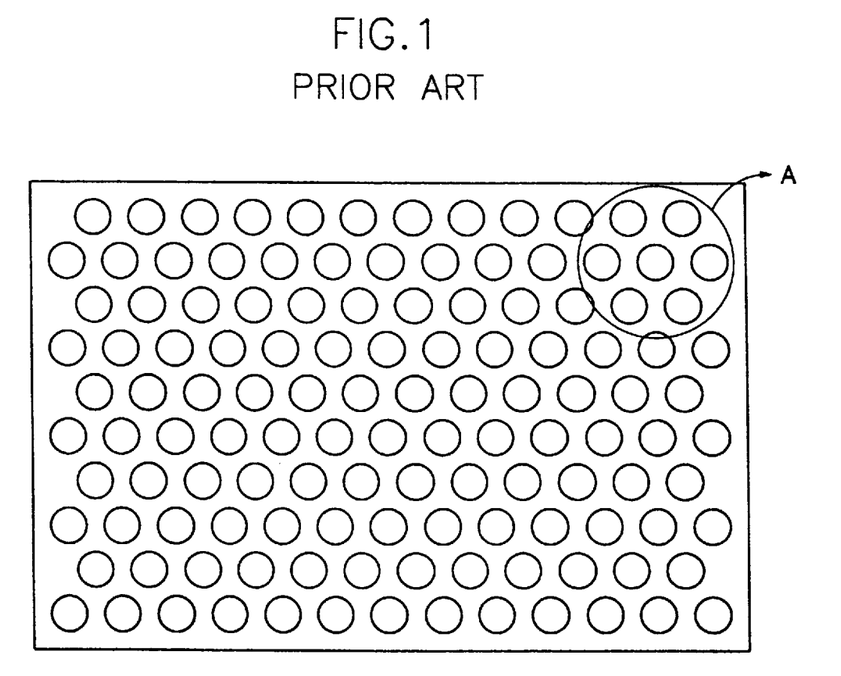
FIG. 1 illustrates the perforated support plate for supporting an electrolytically active substance and serving as an electron collector in the negative electrode of a conventional alkaline secondary battery.
Figure 2:
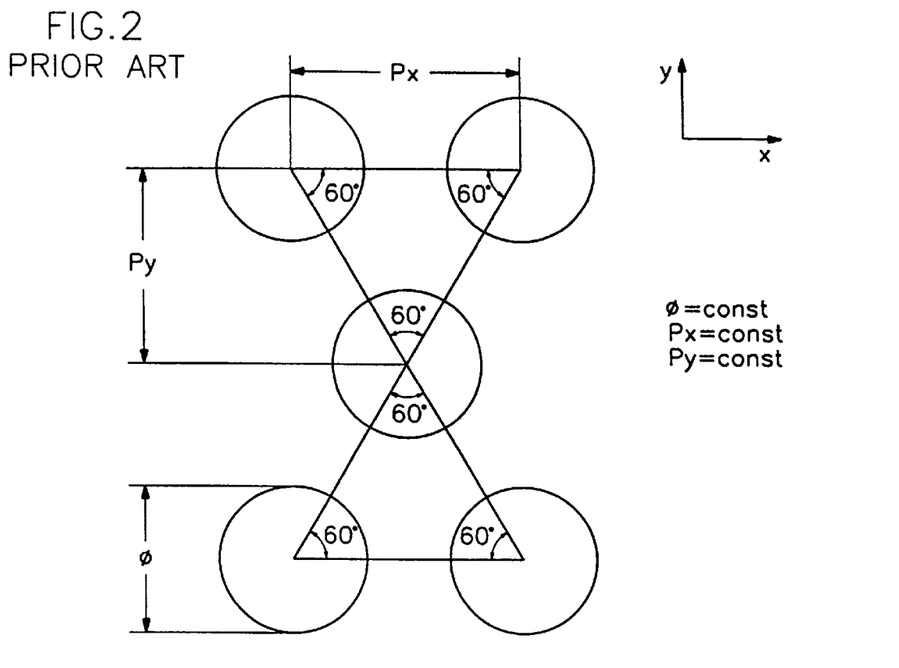
FIG. 2 is an enlarged view of an outer portion of the perforated support plate as shown in FIG. 1.

A conventional supporting plate is shown in FIG. 1. The perforation diameter φ is made to have 1.0 to 2.5 mm, the distance P between the centers of two adjacent openings of the perforation 1.0 to 3.0 mm, and the thickness of the support plate 0.04 to 0.1 mm. When the negative electrode is processed by rolling, cutting and winding during the manufacture of the secondary battery, a portion of the active substance, especially in the outer portions, is removed. Thus, it would be desirable to increase the binding force between the surfaces of the support plate and the electrolytically active substance around the outer portions of the plate. Yet, the perforation diameter and distance is uniformly made throughout the support plate, resulting in reduced electrical conductivity and battery life.

SUMMARY OF THE INVENTION

It is an object of the present invention to provide a means for improving the electrical conductivity of the support plate in an alkaline secondary battery.

It is another object of the present invention to provide a means for improving the strength of the electrode structure of an alkaline secondary battery.

It is still another object of the present invention to provide a means for increasing the life of an alkaline secondary battery.

According to an embodiment of the present invention, a secondary battery comprises:

a cylindrically wound laminate consisting of a positive electrode plate, a negative electrode plate and a separator plate interposed therebetween, one of the electrode plates includes an electrolytically active substance and a perforated support plate for supporting the electrolytically active substance and serving as an electron collector, the electrolytically active substance being applied to both side surfaces of the support plate;

a protective can for enclosing the cylindrically wound laminate; and an electrolyte, wherein the perforation area density of the perforated support plate is made greater in the outer portions than in the central portion, so that the binding forces between the support plate and the electrolytically active substance become substantially uniform throughout the support plate and the conductivity of the support plate is considerably increased.

In one aspect of the present invention, the opening diameter of the perforation is maintained constant throughout the support plate while making variable the distance between two adjacent openings of the perforation in order to increase the perforation area density in the outer portions more than in the central portion.

In another aspect of the present invention, the opening diameter of the perforation is made variable throughout the support plate while maintaining constant the distance between two adjacent openings of the perforation in order to increase the perforation area density in the outer portions more in the central portion.

The present invention will now be described more specifically with reference to the drawings attached only by way of example.

DETAILED DESCRIPTION OF THE PREFERRED EMBODIMENTS

Figure 5:
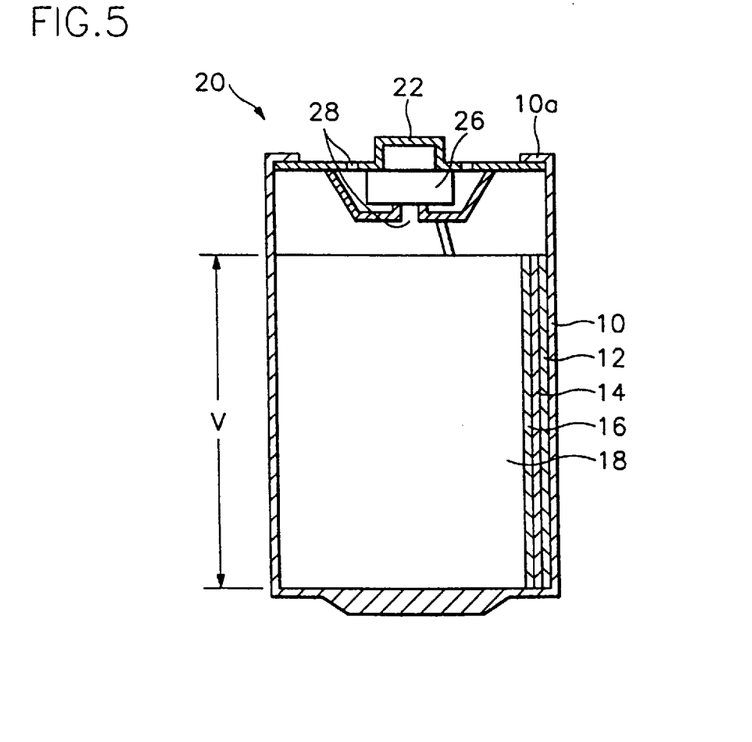
FIG. 5 schematically illustrates a cross-sectional view of a secondary battery containing the inventive structure.

Referring to FIG. 5, a secondary battery, by way of example, a nickel metal hydride battery, is made of a cylindrically wound laminate 18, which consists of a positive electrode plate 12, a negative electrode plate 16 and a separator plate 14 interposed therebetween. This electrode laminate 18 is enclosed in a protective can 10 containing a liquid electrolyte. A cap assembly 20 is to cover the upper end of the can 10.

Figure 3:
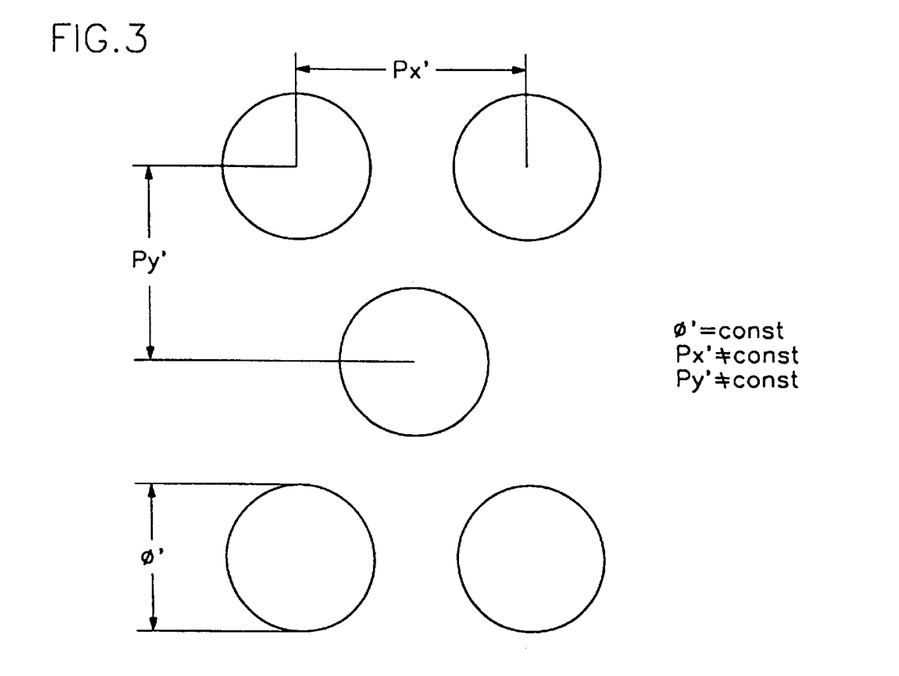
FIG. 3 is a schematic diagram for depicting the configuration of the perforated support plate according to a first embodiment of the present invention.

In order to fabricate an electrode plate, such as the negative electrode plate of the secondary battery according to the present invention, a perforated steel support plate coated with nickel is formed. The perforation area density, i.e., the area of open space in the plate per unit area of the plate, is made 20% to 30% greater in the outer portions than in the central portion. To this end, according to a first embodiment of the present invention with reference to FIG. 3, the opening diameter φ' of the perforation is maintained constant throughout the support plate while making variable the distance Px', Py' between the centers of two adjacent openings of the perforation in order to increase the perforation area density in the outer portions more than in the central portion. In this case, the distance Px', Py' is measured according to a Cartesian coordinate system. Namely, the distance Px', Py' is reduced by 20% to 30% in the outer portions compared to the central portion so that the number of the openings may be increased more in the outer portions than in the central portion.

Figure 10:
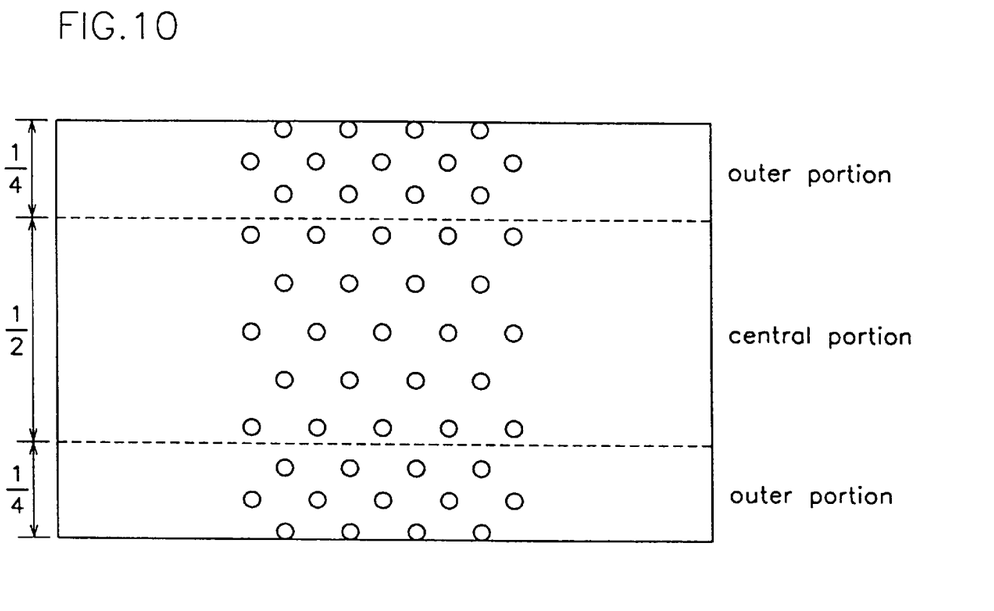
FIG. 10 shows an electrode plate configuration in which the distances between the adjacent perforations in the outer portion are smaller than those in the central portion.

This concept can be implemented in a number of different ways. For example, FIG. 10 illustrates an embodiment of the support plate in which the distances between the adjacent perforations in the outer portion are smaller than those in the central portion.

Figure 11:
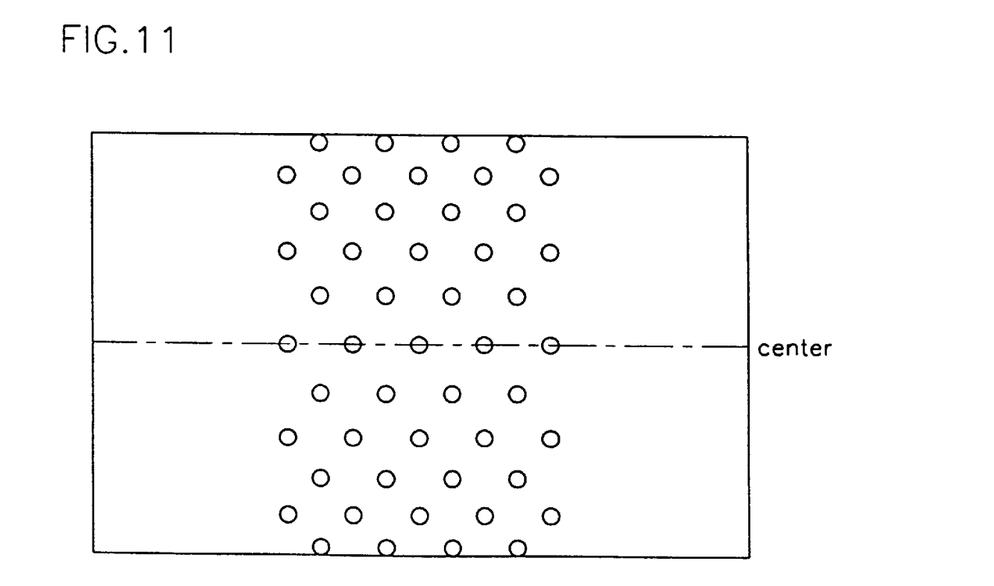
FIG. 11 shows an electrode plate configuration in which the distances between the adjacent perforations gradually decrease from the center to the ends.

FIG. 11 shows a support plate configuration in which the distances between adjacent perforation gradually decrease from the center to the ends.

Figure 12:
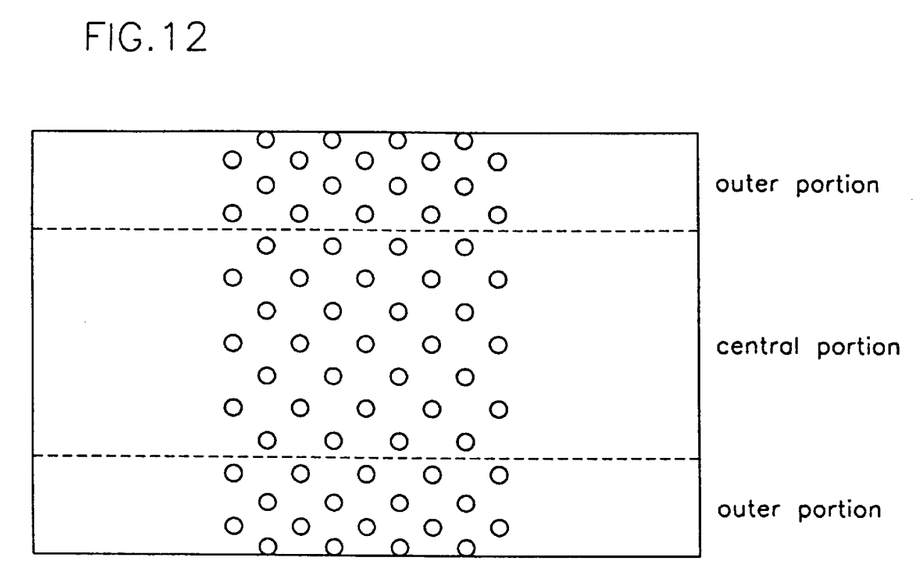
FIG. 12 shows an electrode plate configuration in which the distances between the adjacent perforations in the center portion are constant and those in the outer portion gradually decrease to the ends.

FIG. 12 illustrates a support configuration in which the distances between the adjacent perforations in the center portion are constant and those in the outer portion gradually decrease towards the ends.

It will be appreciated by those skilled in the art that numerous other perforation configurations may be employed to implement this concept.

Figure 4:
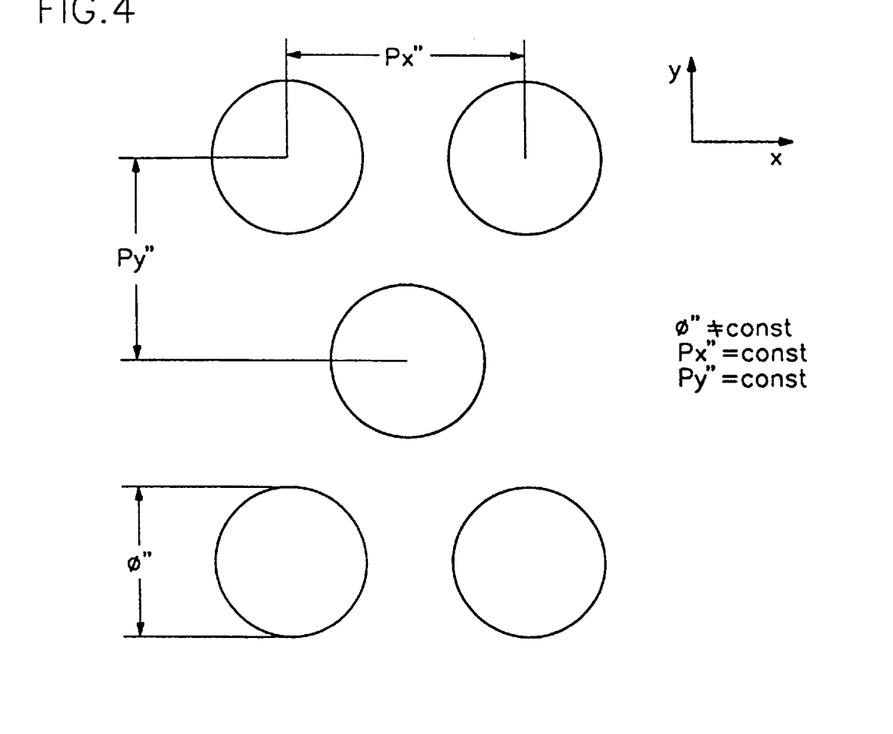
FIG. 4 is a schematic diagram for depicting the configuration of the perforated support plate according to a second embodiment of the present invention.

According to another embodiment of the present invention with reference to FIG. 4, the opening diameter φ" of the perforation is made variable throughout the support plate while maintaining constant the distance Px", Py" between two adjacent openings of the perforation in order to increase the perforation area density in the outer portions more than in the central portion. Namely, the opening diameter φ" of the perforation is increased more in the outer portions than in the central portion, thus making the perforation area density greater in the outer portions more than in the central portion.

Figure 6:
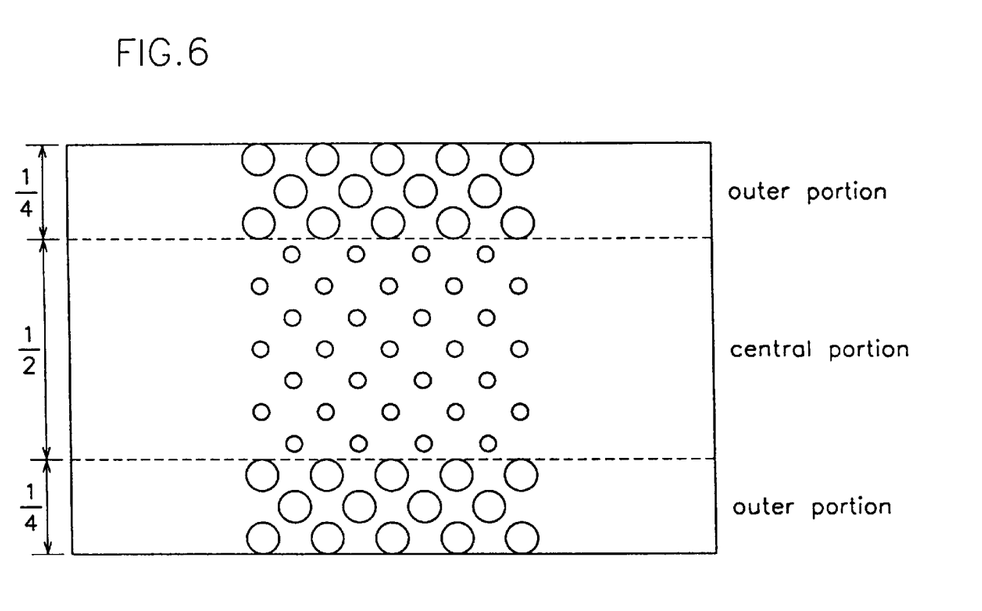
FIG. 6 shows an electrode plate configuration in which the perforation diameters in the outer portion are larger than those in the central portion.

This concept can also be implemented in a number of different ways. For example, FIG. 6 illustrates a support plate in which the perforation diameters in the outer portion are larger than those in the central portion.

Figure 7:
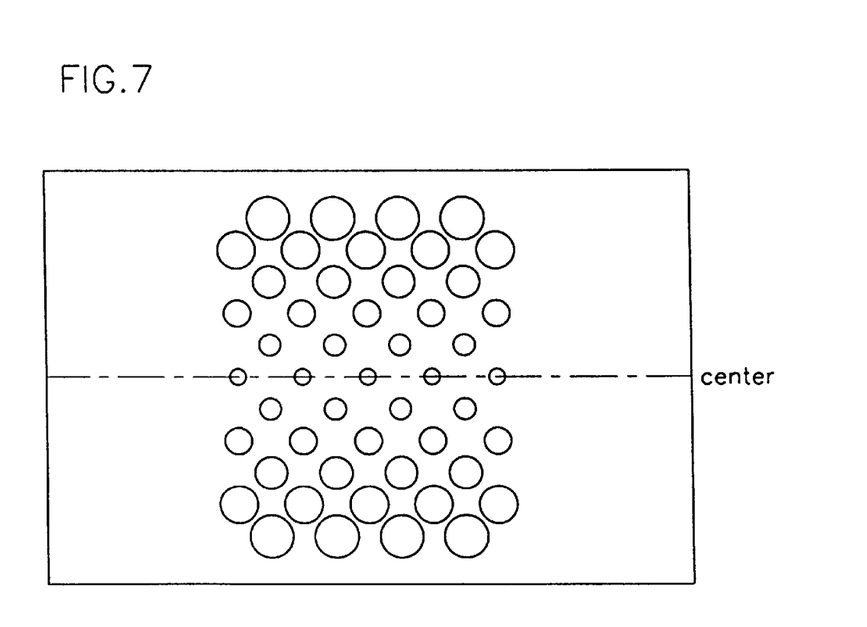
FIG. 7 shows an electrode plate configuration in which the perforation diameters gradually increase from the center to the ends

FIG. 7 shows a support plate configuration in which the perforation diameters gradually increase from the center to the ends.

Figure 8:
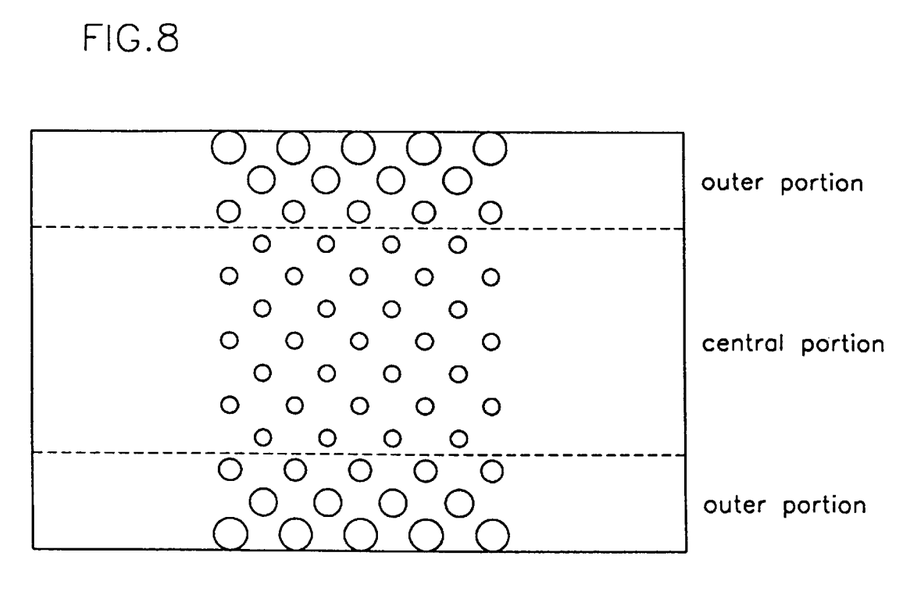
FIG. 8 shows an electrode plate configuration in which the perforation diameters in the center portion are constant and the perforation diameters in the outer portion gradually increase to the ends.

FIG. 8 shows a support plate configuration in which the perforation diameters in the center portion are constant and the perforation diameters in the outer portion gradually increase toward the ends.

Figure 9:
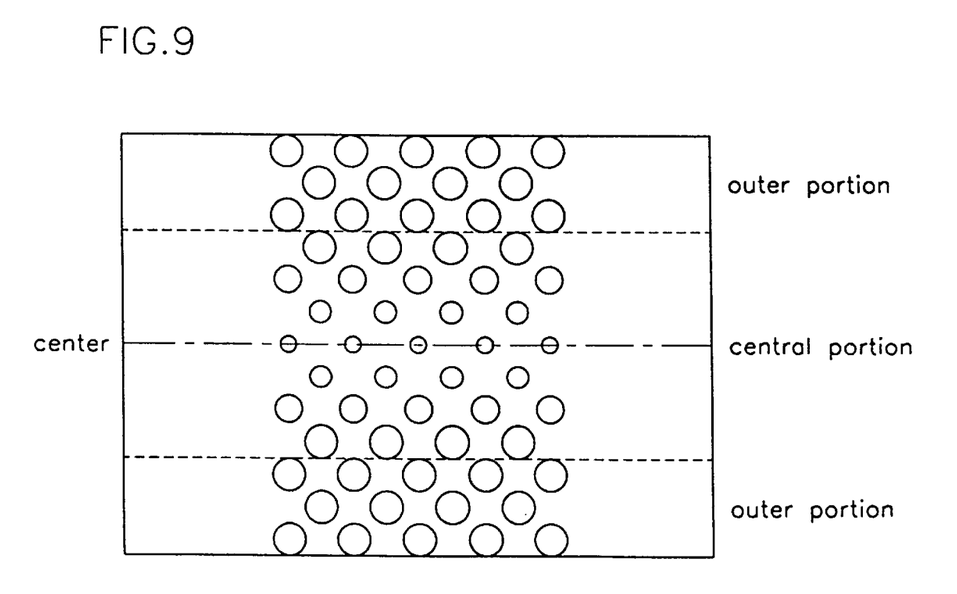
FIG. 9 shows an electrode plate configuration in which the perforation diameters in the outer portion are constant and the perforation diameters in the outer portion gradually increase from the center to the outer portions.

FIG. 9 shows a support plate configuration in which the perforation diameters in the outer portion are constant and the perforation diameters in the central portion gradually increase from the center toward the outer portions.

Figure 13:
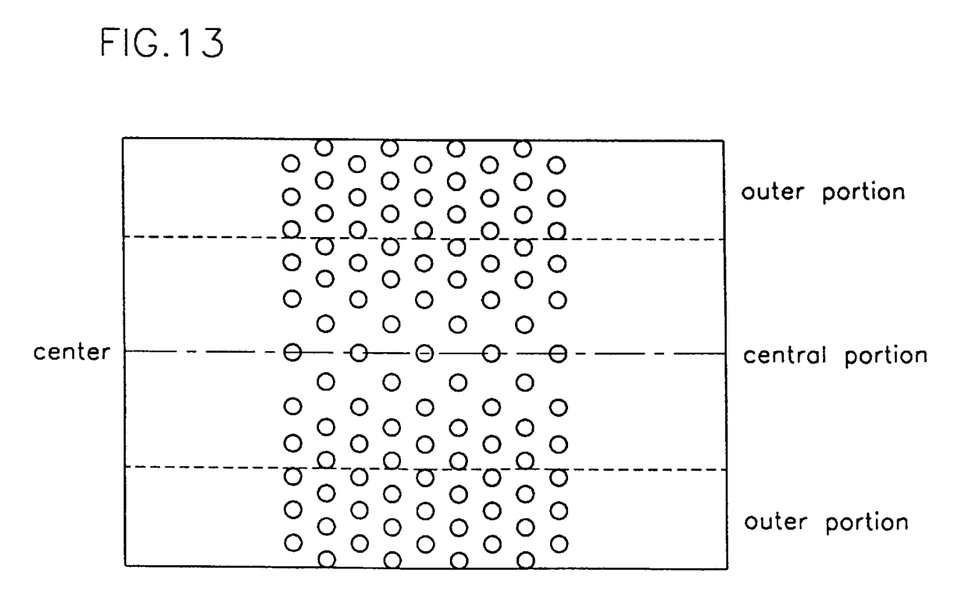
FIG. 13 shows an electrode plate configuration in which the diameters of the perforations in the central portion are constant and those in the outer portion gradually decrease from the center to the outer portions.

FIG. 13 shows a support plate configuration in which the diameters of the perforations in the outer portions are constant and those in the central portion gradually decrease from the center toward the outer portions.

It will be appreciated by those skilled in the art that numerous other perforation configurations may be employed to implement this concept.

Figure 14:
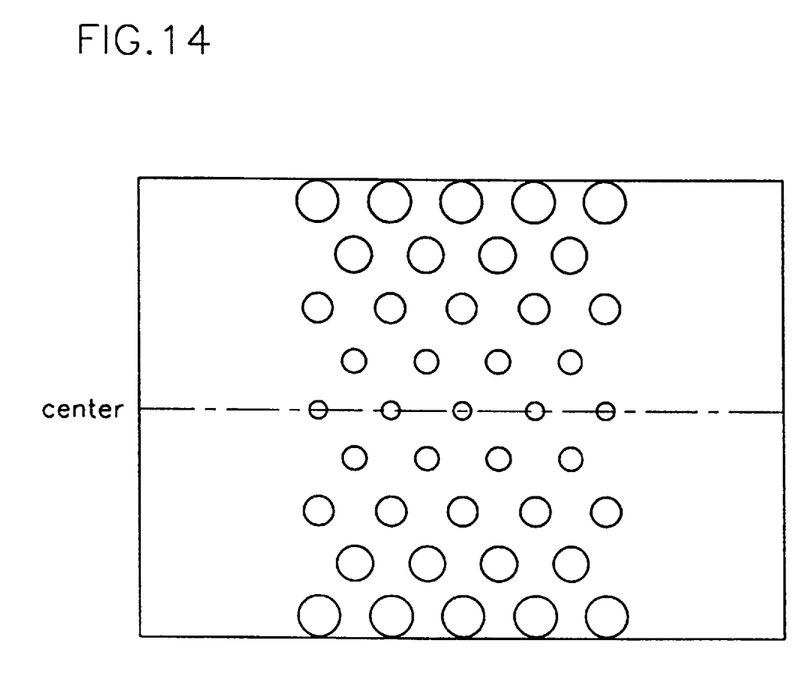
FIG. 14 shows an electrode plate configuration in which the diameters of the perforations gradually increase and the distances between the adjacent perforations gradually decrease from the center to the ends.

In another embodiment, both the opening diameter of the perforation and the distance between the centers of two adjacent openings of the perforation are varied in order to increase the perforation area density in the outer portions more than in the central portion. FIG. 14 is an example of a support plate illustrating this concept. In this embodiment, the diameters of the perforations gradually increase and the distances between the adjacent perforations gradually decrease from the center to the ends of the outer portion.

It will be appreciated that the support plate may be demarcated into several sections so that each section has a different perforation area but increasing going from the central section to the outer sections.

By changing the perforation density across the supporting plate, the variations in the binding forces between the support plate and the active substance due to the manufacturing processes can be compensated for. The binding forces between the support plate and the electrolytically active substance become substantially uniform throughout the support plate and the conductivity of the support plate is considerably increased. Thus, the battery's life is considerably prolonged, so that the number of the recharging and discharging cycles is obtained having the value of more than one thousand, which is an improvement over the conventional battery that has the recharging and discharging cycles of about five hundred times. Of course, the conductivity is increased over conventional nickel metal hydride batteries by more than 95%.

It will be appreciated by those skilled in the art that the invention described herein is not limited to a negative electrode and may be applied to a positive electrode as well. Furthermore, the present invention is applicable to various types of secondary batteries, and not limited to a metal hydride battery. It is, therefore, desired that the present embodiments be considered in all respects as illustrative and not restrictive, reference being made to the appended claims rather than the foregoing description to indicate the scope of the invention.

What is claimed is:

1. A secondary battery comprising:

a cylindrical wound laminate having a positive electrode plate, a negative electrode plate and a separator plate interposed therebetween, wherein one of said electrode plates comprises an electrolytically active substance, and a perforated support plate for supporting said electrolytically active substance and serving as an electron collector, said electrolytically active substance being applied to both side surfaces of said support plate;

a protective can for enclosing said cylindrically wound laminate; and an electrolyte disposed in said protective can, wherein said perforated support plate comprises a perforation area density which is greater adjacent a periphery of said support plate than along a center thereof.

2. The secondary battery as defined in claim 1 wherein the perforations have substantially equal diameters and are formed at varying distances from one another as measured from the center of the perforations.

3. The secondary battery as defined in claim 1 wherein the perforations have varying diameters and are formed at substantially equal distances from one another as measured from the center of the perforations.

4. The secondary battery as defined in claim 1 wherein the perforations have varying diameters and are formed at varying distances from one another as measured from the center of the perforations.

5. The secondary battery as defined in claim 2 wherein the distances between the perforations, as measured from the center of the perforations, gradually decrease from the center of the support plate to the periphery of the support plate.

6. The secondary battery as defined in claim 2 wherein the distances between the perforations, as measured from the center of the perforations, are substantially equal along the center of the support plate, and gradually decrease adjacent the periphery of the support plate in a direction away from the center of the support plate.

7. The secondary battery as defined in claim 2 wherein the distances between perforations, as measured from the center of the perforation, along the center of the support plate are greater than the perforations adjacent the periphery of the support plate.

8. The secondary battery as defined in claim 2 wherein the perforations adjacent the periphery of the support plate have substantially equal distances from one another as measured from the center of the perforations, and the distances of the perforations along the center of the support plant gradually decrease from the center of the support plate in a direction toward the periphery of the support plate.

9. The secondary battery as defined in claim 3 wherein the perforations along the center of the support plate have a smaller diameter than the perforations adjacent the periphery of the support plate.

10. The secondary battery as defined in claim 3 wherein the diameter of the perforations gradually increase from the center of the support plate to the periphery of the support plate.

11. The secondary battery as defined in claim 3 wherein the perforations along the center of the support plate have substantially equal diameters, and the diameters of the perforations adjacent the periphery of the support plate gradually increase in a direction away from the center of the support plate.

12. The secondary battery as defined in claim 3 wherein the diameter of the perforations gradually increase from the center of the support plate in a direction toward the periphery of the support plate, and the perforations adjacent the periphery have substantially equal diameters.

13. The secondary battery as defined in claim 4 wherein the diameters of the perforations gradually increase and the distances between the perforations, as measured from the center of the perforation, gradually decreases from the center of the support plate to the periphery of the support plate.

14. The secondary battery as defined in claim 1 wherein said secondary battery is a nickel metal hydride battery.

15. The secondary battery as defined in claim 1 wherein said one of the electrode plates comprises the negative electrode plate.

* * * * *